US011338398B2

(12) United States Patent
Ridgeway et al.

(10) Patent No.: US 11,338,398 B2
(45) Date of Patent: May 24, 2022

(54) SPACER GRID WELDING FIXTURE

(71) Applicant: BWXT mPower, Inc., Charlotte, NC (US)

(72) Inventors: Roger D. Ridgeway, Lynchburg, VA (US); Jeffrey W. Austin, Evington, VA (US); Jeffrey T. Lee, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 16/998,689

(22) Filed: Aug. 20, 2020

(65) Prior Publication Data

US 2020/0376610 A1     Dec. 3, 2020

Related U.S. Application Data

(62) Division of application No. 14/211,605, filed on Mar. 14, 2014, now Pat. No. 10,759,007.

(60) Provisional application No. 61/781,894, filed on Mar. 14, 2013.

(51) Int. Cl.
*B23K 37/04*     (2006.01)
*B23K 101/24*    (2006.01)

(52) U.S. Cl.
CPC ...... *B23K 37/0408* (2013.01); *B23K 37/0443* (2013.01); *B23K 2101/24* (2018.08)

(58) Field of Classification Search
CPC ............ B23K 37/0408; B23K 37/0443; B23K 2101/24; B23K 37/0426; B23K 37/04
USPC ............. 228/212–213, 44.3–44.7, 47.1–49.6
See application file for complete search history.

(56) References Cited

U.S. PATENT DOCUMENTS

| | | | |
|---|---|---|---|
| 2,944,504 A * | 7/1960 | Herman | B23K 1/0014 269/131 |
| 3,674,637 A | 7/1972 | Delafosse et al. | |
| 3,815,890 A * | 6/1974 | Urban | B23K 37/0443 269/43 |

(Continued)

FOREIGN PATENT DOCUMENTS

| | | |
|---|---|---|
| JP | 01011075 B2 | 1/1989 |
| JP | 03258492 B1 | 11/1991 |

OTHER PUBLICATIONS

International Preliminary Report on Patentability, PCT/US14/27975, dated Sep. 22, 2015, 6 pages.

(Continued)

*Primary Examiner* — Kiley S Stoner
(74) *Attorney, Agent, or Firm* — Nelson Mullins Riley & Scarborough LLP (57) ABSTRACT

A spacer grid welding fixture comprises a frame sized to receive an assembled spacer grid comprising a first set of parallel straps and a second set of parallel straps oriented orthogonally to the first set of parallel straps, the first and second sets of parallel straps interlocked together by slots cut into the straps. A first set of grid engagement bars is placed on a first side of the spacer grid with each grid engagement bar arranged parallel with the straps of the first set of parallel straps and engaging the straps of the second set of parallel straps. A second set of grid engagement bars is placed on an opposite second side of the spacer grid with each grid engagement bar arranged parallel with the straps of the second set of parallel straps and engaging the straps of the first set of parallel straps.

7 Claims, 9 Drawing Sheets

(56) References Cited

U.S. PATENT DOCUMENTS

| | | | | |
|---|---|---|---|---|
| 4,027,868 | A | * | 6/1977 | Jolly ................ B23K 37/0443 269/266 |
| 4,101,752 | A | | 7/1978 | Duncan |
| 4,137,125 | A | | 1/1979 | Walters |
| 4,221,319 | A | | 9/1980 | Paice |
| 4,410,485 | A | | 10/1983 | Lippert |
| 4,492,844 | A | * | 1/1985 | Kobuck ................ G21C 3/3424 219/121.63 |
| 4,519,593 | A | | 5/1985 | Kobuck |
| 4,522,330 | A | | 6/1985 | Kerrey |
| 4,538,956 | A | | 9/1985 | Kalkbrenner |
| 4,539,738 | A | * | 9/1985 | Antol ................ G21C 3/3424 29/467 |
| 4,556,776 | A | | 12/1985 | Duncan |
| 4,595,815 | A | * | 6/1986 | Vere ................ B23K 37/04 219/58 |
| 4,680,443 | A | * | 7/1987 | Vere ................ G21C 3/3424 219/121.14 |
| 4,709,909 | A | | 12/1987 | Duncan |
| 4,711,436 | A | | 12/1987 | Kobuck |
| 4,825,032 | A | | 4/1989 | Duncan |
| 5,398,264 | A | | 3/1995 | Anderson et al. |
| 5,400,373 | A | | 3/1995 | Cotton |
| 5,406,599 | A | | 4/1995 | Johnson, Jr. et al. |
| 5,726,418 | A | | 3/1998 | Duthoo |
| 6,019,359 | A | | 2/2000 | Fly |
| 6,355,906 | B1 | * | 3/2002 | Okuno ................ B23K 26/0838 219/121.63 |
| 7,968,818 | B2 | * | 6/2011 | Song ................ B23K 37/0408 219/121.64 |
| 10,759,007 | B2 | | 9/2020 | Ridgeway et al. |
| 2007/0267391 | A1 | | 11/2007 | Song |
| 2021/0039210 | A1 | * | 2/2021 | Lanz ................ B23K 26/702 |

OTHER PUBLICATIONS

International Search Report and Written Opinion, PCT/US14/27975, dated Jul. 15, 2014, 7 pages.

\* cited by examiner

SPACER GRID WELDING FIXTURE

CLAIM OF PRIORITY

This application is a division of U.S. patent application Ser. No. 14/211,605 filed on Mar. 14, 2014, now U.S. Pat. No. 10,759,007, which claims the benefit of U.S. Provisional Patent Application No. 61/781,894 filed on Mar. 14, 2013, the disclosures of which are hereby incorporated by reference in their entirety.

BACKGROUND

A nuclear reactor core is typically constructed as an array of fuel assemblies (FA's) in which each FA is vertically coextensive with the height of the reactor core and the array of FA's spans the lateral dimensions of the reactor core. Each FA comprises an array of vertically oriented fuel rods held together by a structural skeleton comprising a set of horizontal spacer grids spaced apart along the vertical direction which are welded to guide tubes or other rod-like vertical elements. The upper and lower ends of the FA are capped by upper and lower end fittings (also sometimes called nozzles) connected to the guide tubes by fasteners, welding, or the like.

Typically, the spacer grids are made up of interlocking straps, where each strap is machined (e.g. stamped) from a strip of metal, such as a nickel-chromium alloy (e.g., Inconel') strip or a zirconium alloy (e.g., Zircaloy™) strip. The intersecting straps define openings, also called cells, through which fuel rods pass. The straps are machined or stamped to define dimples (i.e., "hard" stops, protrusions having high stiffness), springs (i.e. "soft" stops, protrusions having low stiffness), or other retention features to hold the fuel rods passing through the spacer grid.

Prior to welding, the assembly of interlocked straps is relatively loose, and is not structurally rigid. Therefore, the assembly of interlocked straps is mounted in a spacer grid welding fixture during the welding process.

Existing spacer grid welding fixtures typically follow one of two methods for holding the straps in position for the welding. The first approach uses pins that are inserted into the cells of the spacer grid. The pins have suitably machined surfaces that hold the straps in position. The pins are also machined to clear stamped features and the intersection weld. The second approach employs fixture plates. The spacer grid is inserted into the fixture plate which positions the straps by contacting strap features. Typically, the solid and slotted sides of the straps are both held by the fixture.

These existing grid welding fixtures have substantial disadvantages. They are difficult to machine. Inserting the assembled (but not yet welded) spacer grid into the fixture is difficult, because the entire interlocking assembly is inserted as a unit. Prior to welding, the slotted straps are flexible and may be damaged if not properly aligned in the welding fixture. Strap misalignment is difficult to detect when inserting all straps as an assembled interlocked unit into a fixture, and if a strap is damaged the entire grid assembly must be removed to replace the damaged strap. Furthermore, the grid cell pitch typically shrinks during welding, which can have the effect of "locking" the grid assembly into the fixture. High fixture removal forces are common with existing spacer grid welding fixture plates. Overcoming these forces may result in damage to the grid, and also generates tooling wear.

BRIEF SUMMARY

In some embodiments described herein as illustrative examples, a spacer grid welding fixture comprises: a frame sized to receive an assembled spacer grid comprising a first set of parallel straps and a second set of parallel straps oriented orthogonally to the first set of parallel straps, the first and second sets of parallel straps interlocked together by slots cut into the straps; a first set of grid engagement bars placed on a first side of the spacer grid, each grid engagement bar of the first set of grid engagement bars being arranged parallel with the straps of the first set of parallel straps and engaging the straps of the second set of parallel straps; and a second set of grid engagement bars placed on an opposite second side of the spacer grid, each grid engagement bar of the second set of grid engagement bars being arranged parallel with the straps of the second set of parallel straps and engaging the straps of the first set of parallel straps. In some embodiments ends of the grid engagement bars nest into slots of the frame. In some embodiments the spacer grid welding fixture further comprises retaining bars securing the ends of the grid engagement bars to the frame.

In some embodiments described herein as illustrative examples, a method comprises: securing an assembled spacer grid comprising a first set of parallel straps and a second set of parallel straps oriented orthogonally to the first set of parallel straps in a spacer grid welding fixture as set forth in the immediately preceding paragraph; welding the assembled spacer grid while secured in the spacer grid welding fixture to form a welded spacer grid; and removing the welded spacer grid from the spacer grid welding fixture. In some embodiments the securing comprises: (i) placing the assembled spacer grid in the frame of the spacer grid welding fixture with the first side of the spacer grid exposed; (ii) placing the first set of grid engagement bars on the first side of the spacer grid and securing the ends of the first set of grid engagement bars to the frame of the spacer grid welding fixture; and (iii) placing the second set of grid engagement bars on the second side of the spacer grid and securing the ends of the second set of grid engagement bars to the frame of the spacer grid welding fixture. Some such embodiments further include flipping the frame over between placement operations (ii) and (iii).

In some embodiments described herein as illustrative examples, a spacer grid welding fixture includes a frame sized to receive an assembled spacer grid comprising a first set of parallel straps and a second set of parallel straps oriented orthogonally to the first set of parallel straps and interlocked with the first set of parallel strips by slots cut into the straps, and grid engagement bars. Each grid engagement bar is configured to be secured to the frame on a side of a spacer grid disposed in the frame and has grooves configured to engage straps of an assembled spacer grid disposed in the frame that are oriented orthogonally to the grid engagement bar. The frame may include a first set of slots formed into a first side of the frame and positioned to receive ends of a first set of mutually parallel grid engagement bars, and a second set of slots formed into a second side of the frame opposite the first side of the frame and positioned to receive ends of a second set of mutually parallel grid engagement bars that are oriented orthogonally to the first set of mutually parallel grid engagement bars.

In some embodiments described herein as illustrative examples, an apparatus includes a spacer grid welding fixture as set forth in the immediately preceding paragraph, and an assembled spacer grid disposed in the frame. The assembled spacer grid comprises a first set of parallel straps and a second set of parallel straps oriented orthogonally to the first set of parallel straps and interlocked with the first set of parallel strips by slots cut into the straps. Each grid engagement bar of the frame is secured to the frame on a side of a spacer grid with its grooves engaged with straps of the assembled spacer grid disposed in the frame that are oriented orthogonally to the grid engagement bar. The grid engagement bars may include: a first set of mutually parallel grid engagement bars secured to a first side of the frame with their grooves engaged with straps of the assembled spacer grid disposed in the frame that are oriented orthogonally to the first set of mutually parallel grid engagement bars; and a second set of mutually parallel grid engagement bars secured to a second side of the frame opposite the first side of the frame with their grooves engaged with straps of the assembled spacer grid disposed in the frame that are oriented orthogonally to the first set of mutually parallel grid engagement bars; wherein the second set of mutually parallel grid engagement bars are oriented orthogonally to the first set of mutually parallel grid engagement bars. In one embodiment, the first side of the frame includes receiving slots with the ends of the first set of mutually parallel grid engagement bars nesting into the receiving slots of the first side of the frame, and the second side of the frame includes receiving slots with the ends of the second set of mutually parallel grid engagement bars nesting into the receiving slots of the second side of the frame.

In some embodiments described herein as illustrative examples, a method comprises: (i) disposing an assembled spacer grid comprising a first set of parallel straps and a second set of parallel straps oriented orthogonally to the first set of parallel straps and interlocked with the first set of parallel strips by slots cut into the straps in a frame of a spacer grid welding fixture; and (ii) after performing operation (i), disposing grid engagement bars onto the assembled spacer grid with grooves of the grid engagement bars engaging straps of the assembled spacer grid that are oriented orthogonally to the grid engagement bar and with ends of the grid engagement bars nesting into slots in the frame of the spacer grid welding fixture. The operation (ii) in some embodiments comprises: (iia) disposing a first set of mutually parallel grid engagement bars onto a first side of the assembled spacer grid; and (iib) disposing a second set of mutually parallel grid engagement bars onto a second side of the assembled spacer grid opposite the first side of the assembled spacer grid with the second set of mutually parallel grid engagement bars being disposed orthogonally to the first set of mutually parallel grid engagement bars. After securing the ends of the grid engagement bars into the slots in the frame of the spacer grid welding fixture, the method further includes welding junctions between straps of the assembled spacer grid. The welding may further include welding guide tubes to the assembled spacer grid to form a structural skeleton for a fuel assembly. The method may further include loading fuel rods comprising fissile $^{235}$U into the structural skeleton to generate a nuclear reactor fuel assembly.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

To provide context, a nuclear reactor of the pressurized water reactor (PWR) variety described here by way of example includes a nuclear reactor core disposed in a lower vessel portion of a pressure vessel. The nuclear reactor core comprises a fissile material (e.g., $^{235}$U) immersed in primary coolant water. A cylindrical central riser is disposed coaxially inside the cylindrical pressure vessel and a downcomer annulus is defined between the central riser and the pressure vessel. The illustrative PWR includes internal control rod drive mechanisms (internal CRDMs) that control insertion of control rods to control reactivity; however, the reactor can alternatively employ external CRDMs. Guide frame supports guide the control rods, which may be yoked together by a spider and connected via a connecting rod with the CRDM. While internal steam generators located inside the pressure vessel are described, alternatively the steam generators may be located outside the pressure vessel (i.e., a PWR with external steam generators). In a nuclear power plant, the steam from the outlet of the steam generator is suitably used to drive a turbine. The illustrative PWR includes an integral pressurizer at the top of the upper vessel section which defines an integral pressurizer volume; however, an external pressurizer connected with the pressure vessel via suitable piping may also be employed. The primary coolant may be circulated by reactor coolant pumps (RCPs), e.g. comprising external RCP motors driving an impeller located in a RCP casing disposed inside the pressure vessel. It is to be appreciated that the PWR just described is merely an illustrative example—the disclosed spacer grids and spacer grid welding fixtures are suitably employed in substantially any type of PWR as well as in nuclear reactors of other types such as boiling water reactor (BWR) designs. A conventional BWR design does not include any steam generator, but rather converts coolant circulating in the pressure vessel to steam in an upper "phase separator" region of the pressure vessel, and this steam is then piped out to drive a turbine.

Figure 1:
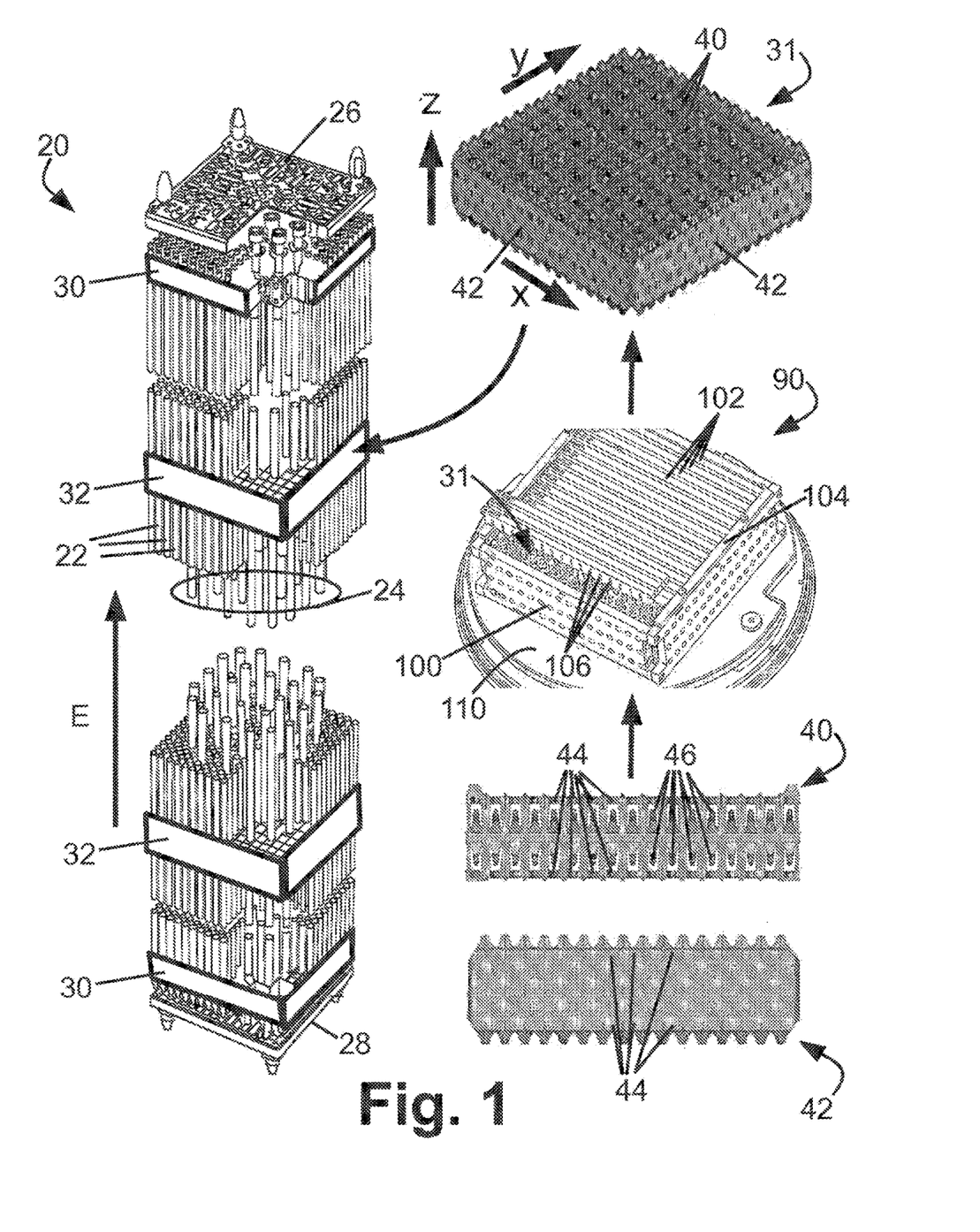
FIG. 1 diagrammatically shows a representative fuel assembly and an illustrative process for assembling a spacer grid.

With reference to FIG. 1, a representative fuel assembly 20 is diagrammatically shown on the left-hand side of FIG. 1 with partial breakaway and the front top corner of the perspective view cut away to reveal internal components. The fuel assembly 20 is suitably employed as an element of the nuclear reactor core disposed in the pressure vessel of a nuclear reactor. The fuel assembly 20 includes an array of vertically oriented fuel rods 22 each comprising a fissile material such as $^{235}$U. For example, each fuel rod may contain enriched uranium dioxide ($UO_2$) or mixed $UO_2$/gadolinium oxide ($UO_2$—$Gd_2O_3$) pellets. Interspersed amongst the fuel rods 22 are guide tubes 24 that provide conduits for control rods, in-core instrumentation, or so forth. The top of the fuel assembly 20 is terminated by an upper end fitting or nozzle 26 and the bottom of the fuel assembly 20 is terminated by a lower end fitting or nozzle 28. The vertical direction of the fuel assembly 20 is denoted as the vertical or "elevation" direction E in FIG. 1.

The fuel assembly 20 is held together by a plurality of spacer grids including end grids 30 disposed near the top and bottom of the fuel assembly 20 and one or (typically) more mid-grids 32 disposed at spaced apart positions between the top and bottom of the fuel assembly 20. (Said another way, each end spacer grid 30 is closer to an end of the bundle of fuel rods 22 than the mid-grid 32). Illustrative FIG. 1 shows only two mid-grids 32, but typically additional mid-grids are present which are omitted in the cutaway illustration. The number of mid-grids, and the spacing of the end grids and mid grids along the height of the fuel assembly, is determined based on the total length of the bundle of fuel rods, the structural characteristics of the fuel rods, applicable regulatory requirements, and so forth. As indicated diagrammatically in FIG. 1, the grids 30, 32 of all fuel assemblies typically are aligned with each other so that any contact between adjacent fuel assemblies is grid-to-grid contact. (Such uniformity among the fuel assemblies is also advantageous from a manufacturing standpoint). The grids 30, 32 comprise interlocking metal straps formed from metal sheets by stamping or other machining techniques. The metal may be a nickel-chromium alloy (e.g., Inconel), or a zirconium alloy (e.g., Zircaloy), or so forth. Inconel is stronger than Zircaloy; however, Zircaloy has a smaller neutron absorption cross-section as compared with Inconel. Thus, in some embodiments the end grids 30 are made of Inconel while the mid-grids 32 are made of Zircaloy.

With continuing reference to FIG. 1, some design features of some illustrative spacer grids disclosed herein are shown on the right-hand side. FIG. 1 upper right shows a perspective view of an illustrative spacer grid 31 (where the grid 31 may in general serve as either one of the end grids 30 or one of the mid-grids 32 of the fuel assembly 20 shown on the left-hand side of FIG. 1). FIG. 1 right-hand side lower region shows an interior strap 40 of the grid 31, and an outer strap 42 of the grid 31. Cells for retaining fuel rods are defined by intersecting interior straps 40, and include fuel rod retention features such as illustrative dimple features (or stops) 44 and spring features 46. When the fuel rod is inserted into the fuel assembly during manufacturing, these features 44, 46 engage and retain the fuel rod. Some cells of the spacer grid 31 serve as conduits for guide tubes 24 (see FIG. 1 left-hand side) and may have a different configuration adapted for that purpose, e.g. including welding tabs. The guide tubes are typically welded to the grids 31 to form (optionally along with the nozzles 26, 28) the structural skeleton of the fuel assembly 20.

Figure 2:
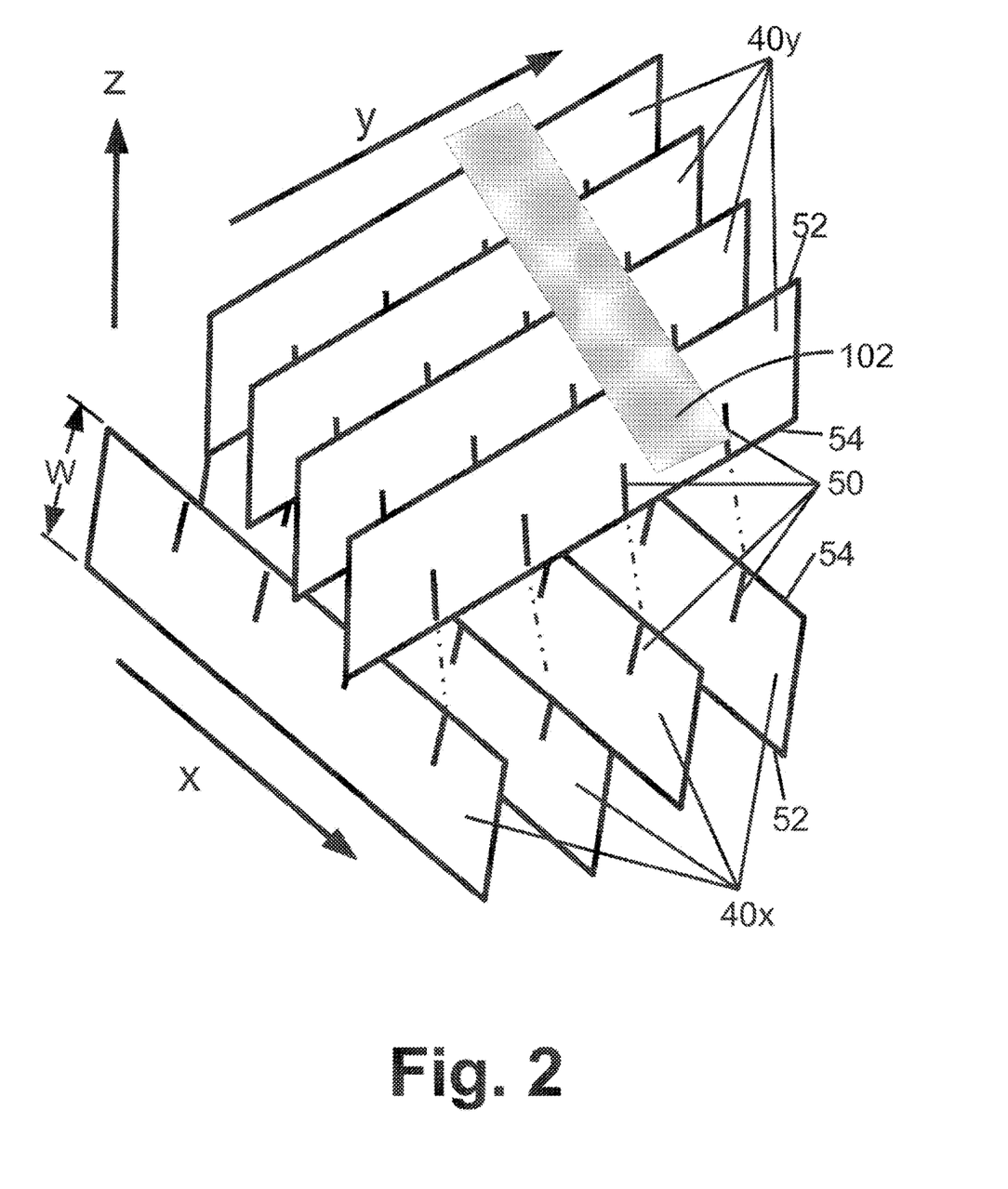
FIGS. 2, 3, and 4 illustrate a perspective view and alternative side views, respectively, of an exploded spacer grid aligned to interlock the two sets of parallel straps which are oriented orthogonally to each other.
Figure 3:
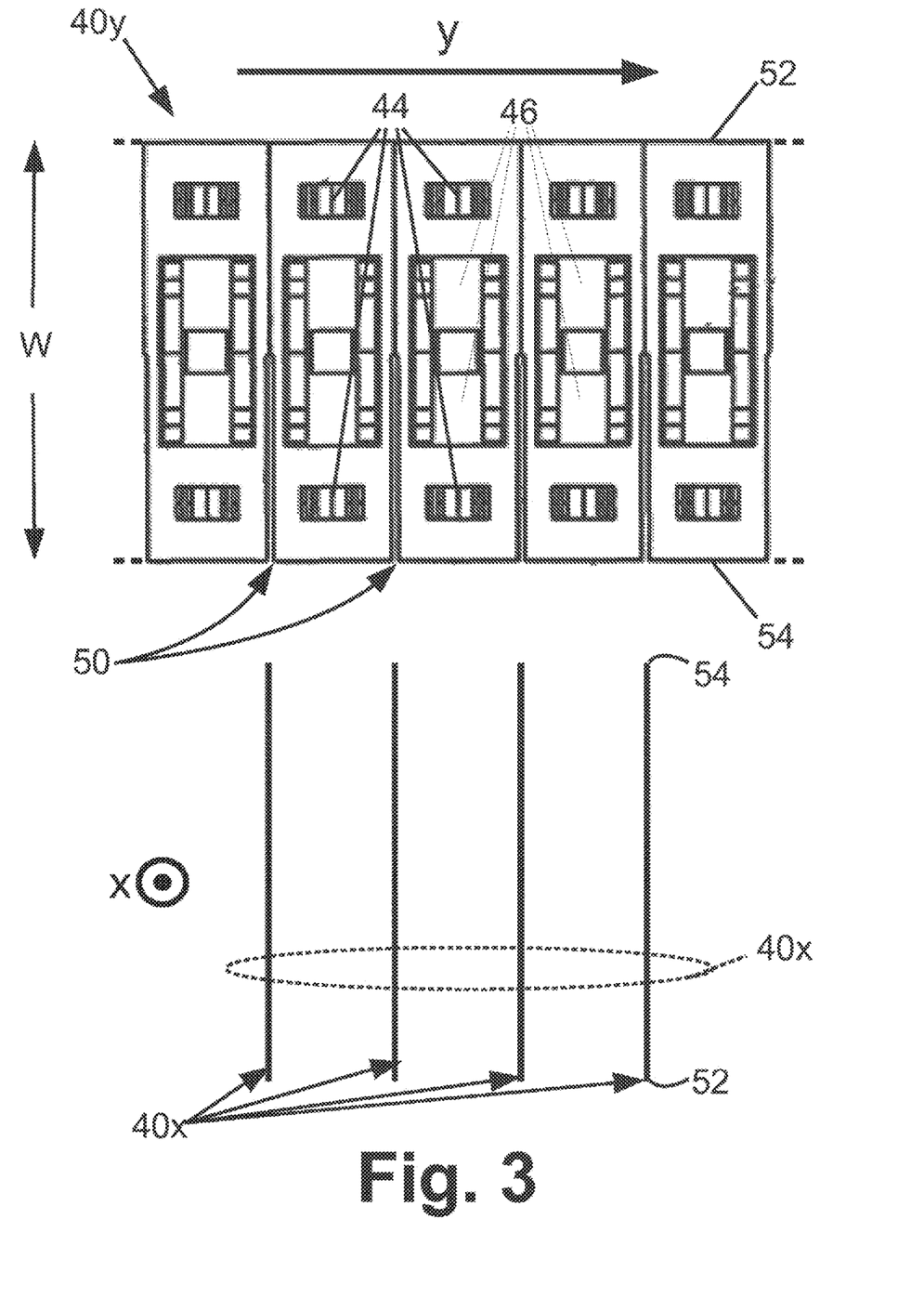
Figure 4:
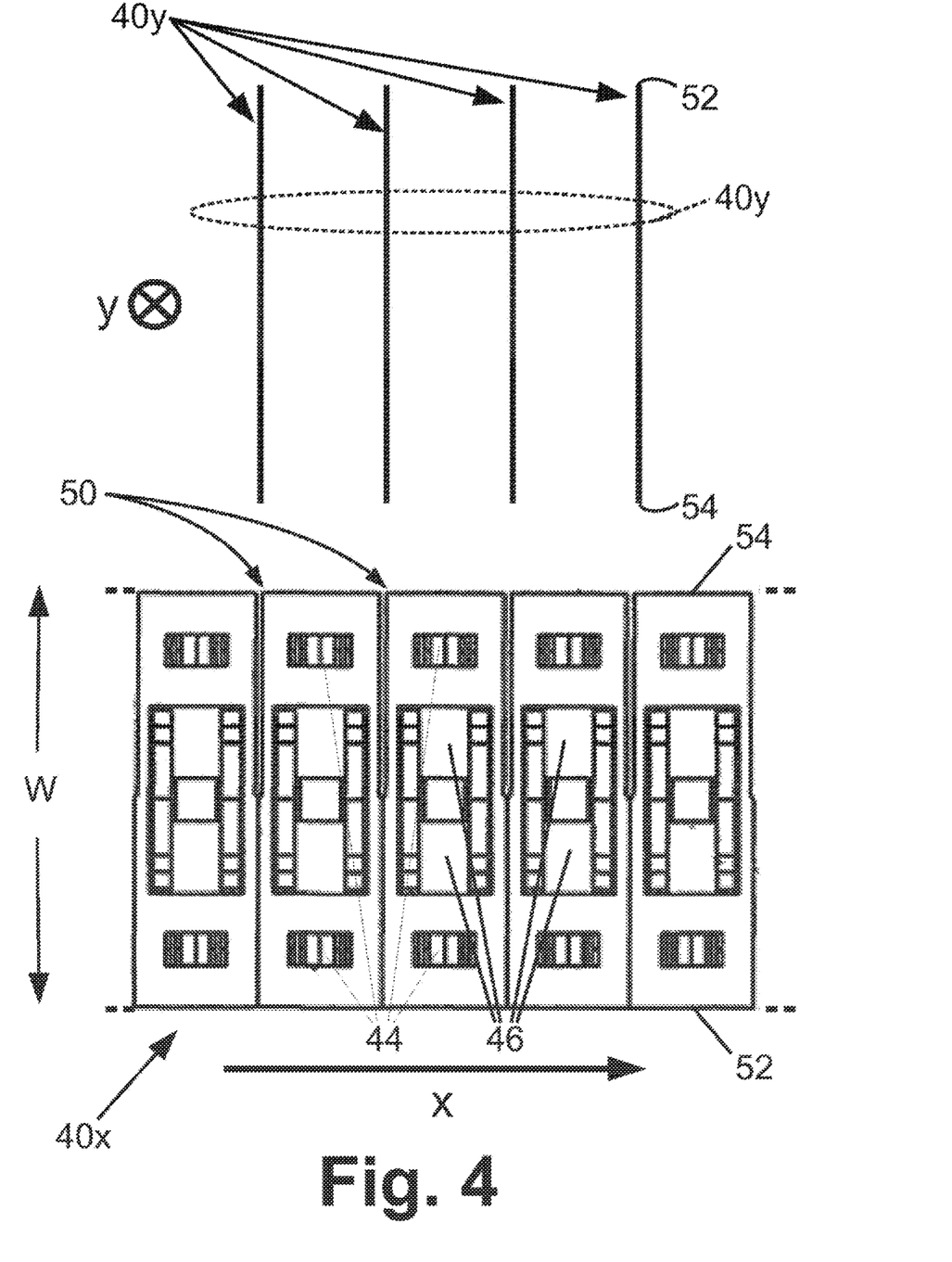

With reference now to FIG. 2, the assembly of a spacer grid from interlocking straps is illustrated. Prior to assembly of the interlocking structure, the metal strips are stamped or otherwise processed to form the retention features (e.g. dimples, springs, et cetera), and slots 50 for interlocking straps oriented along the x-direction (labeled straps 40x in FIG. 2) and straps oriented along the y-direction (labeled straps 40y in FIG. 2) are cut. The resulting processed strips are typically referred to in the art as straps. In diagrammatic FIG. 2, the retention features 44, 46 are not shown for illustrative convenience (but see FIG. 1), while the slots 50 are shown. In the assembly, a set of straps of one orientation are interlocked with a set of straps oriented orthogonally to the first set of straps. Without loss of generality, in the illustrative examples the first set of straps is referred to as "x-oriented straps" 40x and the second set of straps is referred to as "y-oriented straps" 40y. The z-direction in accord with a right-hand Cartesian coordinate system is also labeled in FIG. 2. See also FIG. 1 right-hand side upper portion where these directions are also labeled for the assembled interlocked spacer grid 31. Each strap 40 has a width in the z-direction denoted (again without loss of generality) as "W", and has two defined sides—a solid side 52, and a slotted side 54, where slots 50 parallel the z-direction are formed into the slotted side 54 and extend halfway through the strap 40 (that is, a length W/2 into the strap 40), and the solid side 52 has no slots. (More generally, the combined length of the slots 50 in the x-oriented straps 40x and the y-oriented straps 40y should total W; but it is generally advantageous to have the slots symmetrically equal to W/2 in both the x-oriented straps and the y-oriented straps). As seen in FIG. 2, the x-oriented straps 40x and the y-oriented straps 40y are arranged with the slotted sides 54 facing, and are interlocked by engaging slots 50 of the x-oriented straps 40x with aligned slots 50 of the orthogonal y-oriented straps 40y to form an assembled spacer grid such as the illustrative spacer grid 31 of FIG. 1 right-hand side upper portion. (Note that in simplified FIG. 2 there are only four x-oriented straps 40x interlocking with four y-oriented straps 40y; more typically a larger number of straps will be used, e.g. as shown in the assembled spacer grid of FIG. 1 right-hand side upper portion, and moreover as seen in that drawing the outermost straps may be different in kind, e.g. comprising the outer straps 42 shown in FIG. 1 right-hand side lower portion). FIG. 2 shows a perspective view with the two sets of straps 40x, 40y arranged with their slotted sides 54 facing and with their respective slots 50 generally aligned, but before they are brought together to interlock the slots. FIG. 3 shows the arrangement of FIG. 2 looking along the -x axis (that is, with the x-oriented straps 40x viewed "on-edge"), while FIG. 4 shows the arrangement of FIG. 2 looking along the +y axis (that is, with the y-oriented straps 40y viewed "on-edge"). Note that in FIGS. 3 and 4 the retention features (e.g. dimples 44 and springs 46) are shown in the strap viewed flat, but are not indicated in the straps viewed "on-edge".

After interlocking the straps 40x, 40y, the joined slots 50 are welded together to generate a structurally rigid spacer grid. The slotted sides 54 of the intersecting straps 40x, 40y are inserted together (i.e. interlocked) to form the spacer grid array 31 (e.g. as shown in FIG. 1 left-hand side upper portion). The slotted sides 54 of the straps 40 are relatively flexible. The solid sides 52 of the straps 40 are held in place by the split (i.e. slotted) sides 54. The slots 50 are typically stamped with limited clearance above the strip thickness.

Figure 5:
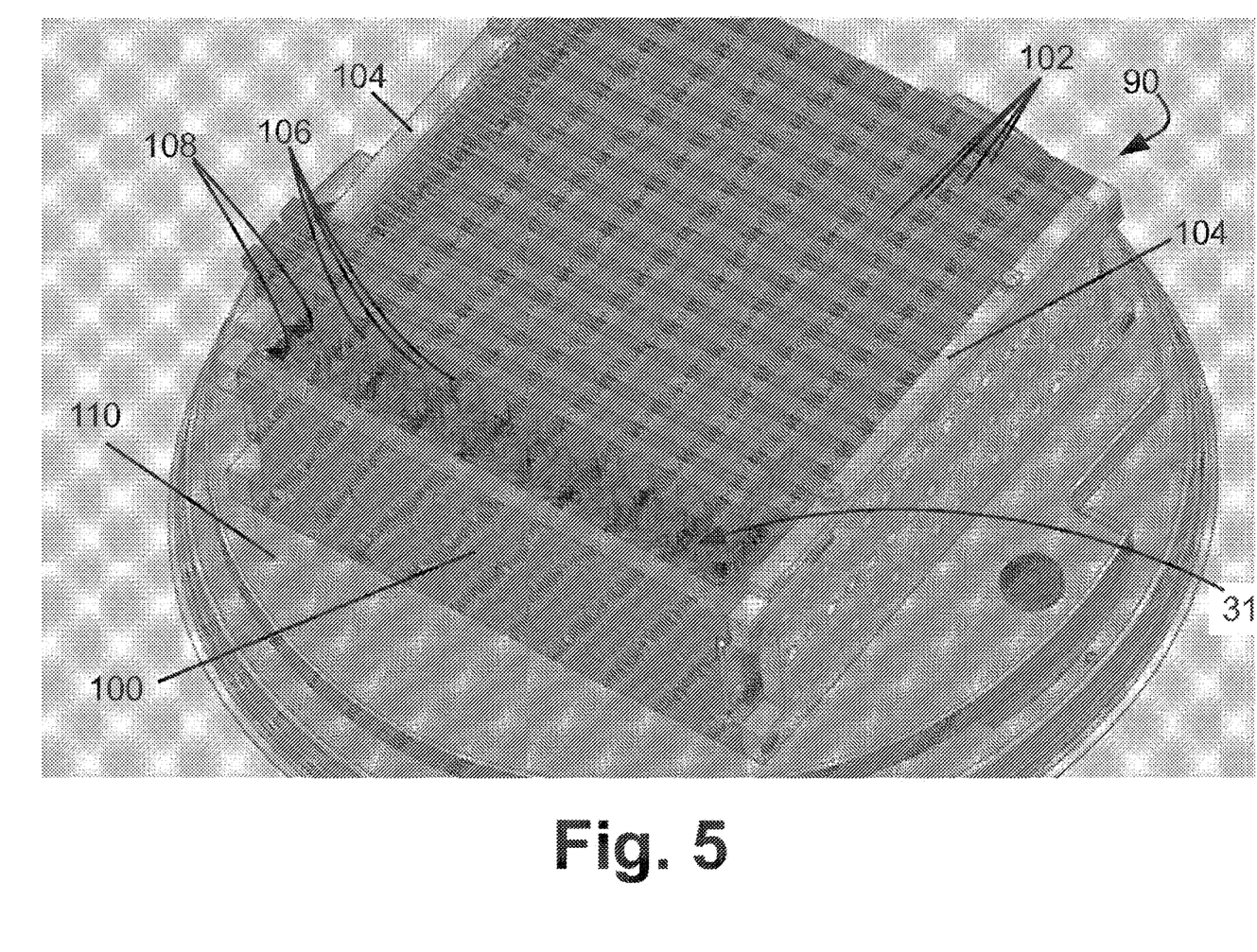
FIGS. 5 and 6 show perspective views of a spacer grid welding fixture as disclosed herein.
Figure 6:
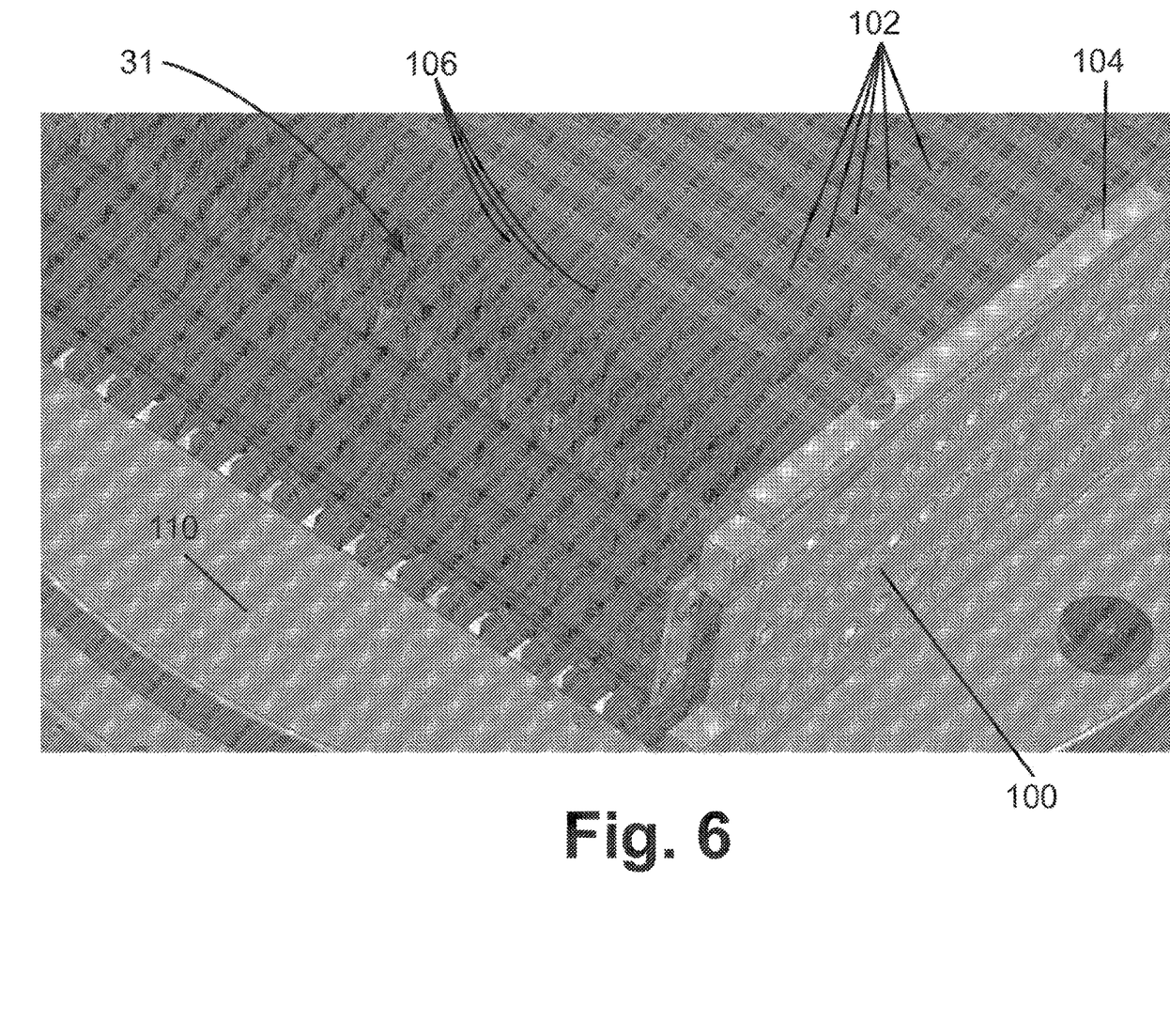

With returning reference to FIG. 1 and with further reference to FIGS. 5 and 6, a spacer grid welding fixture 90 is illustrated, which includes a frame 100 sized to receive the assembled spacer grid 31 (visible in part in FIGS. 5 and 6), a set of grid engagement bars 102, and retaining bars 104. Each grid engagement bar 102 engages the solid side 52 of straps oriented transverse to the grid engagement bar 102, for example by grooves 106 cut into each grid engagement bar 102 that engage the solid sides 52 of the straps oriented orthogonally to the engagement bar. The grooves 106 are suitably oriented transverse to the long direction of the engagement bar 102 so as to engage the solid sides 52 of the orthogonally oriented straps. Thus, a set of parallel y-oriented grid engagement bars 102 are used to engage the solid sides of the x-oriented straps; and a set of parallel x-oriented grid engagement bars 102 are used to engage the solid sides of the y-oriented straps. (Note that FIGS. 5 and 6 show only one side of the fixture 90 and the grid engagement bars 102 on that side engage the solid sides of only one set of straps, either the x-oriented straps or the y-oriented straps. The opposite side of the fixture is not shown, but is identical except being rotated by 90° to engage the solid sides of other set of straps.) The ends of the grid engagement bars 102 nest into slots 108 of the frame 100 to ensure precise alignment of the engagement bars 102. (Note that the slots 108 in the frame 100 are labeled only in FIG. 5, where three grid engagement bars 102 are canted or "mis-mounted" so that one end of each of these three grid engagement bars is out-of-place so as to reveal its intended receiving slot 108 in the frame 100. Moreover, due to the vantage point, only two of these three empty slots 108 are visible in FIG. 5.) After the engagement bars 102 are installed, the retaining bars 104 are mounted on the frame 100 to lock the ends of the engagement bars 102 into the frame 100.

Figure 7:
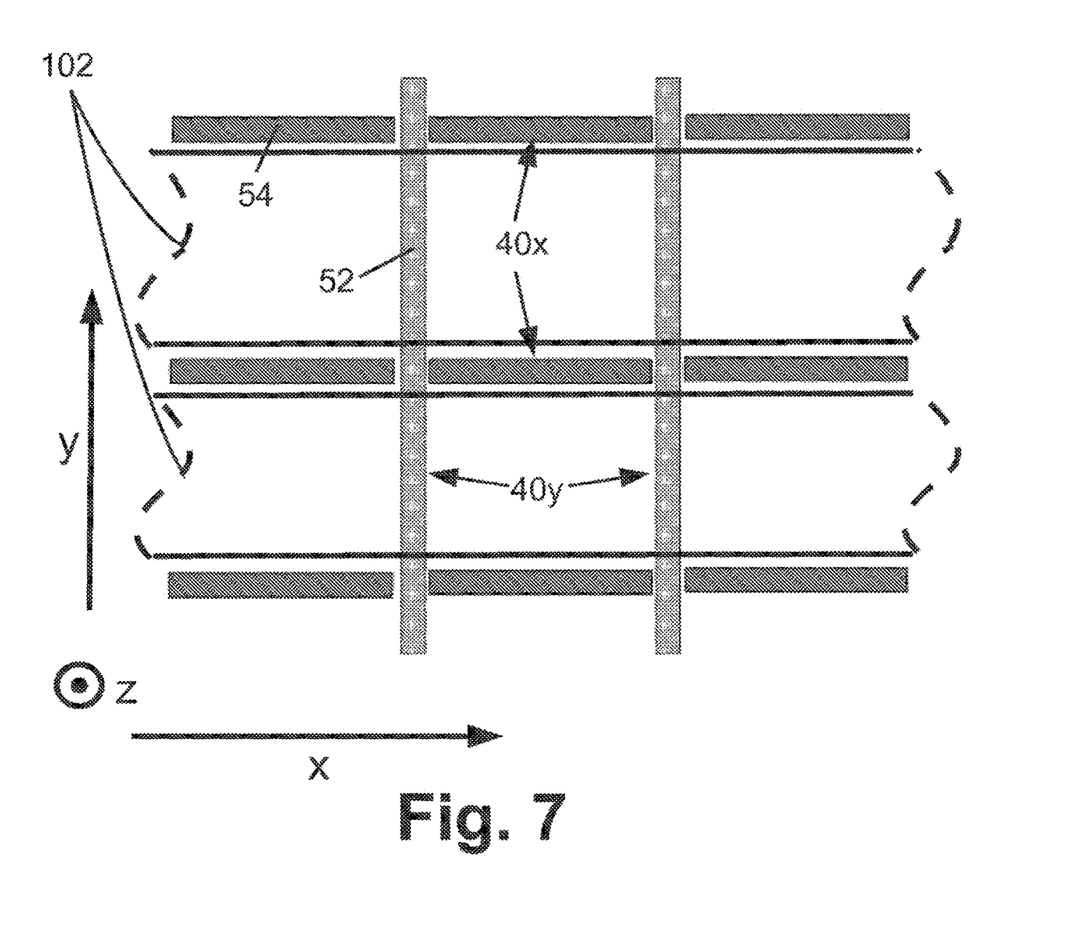
FIG. 7 diagrammatically shows the arrangement of the grid engagement bars of the fixture of FIGS. 5 and 6 respective to interlocked straps.

With reference to FIG. 7, as further illustration a diagrammatic view of the intersection region of three x-oriented straps 40x and two y-oriented straps 40y is shown, viewed along the -z direction with the slotted sides 54 of the x-oriented straps 40x and the solid sides 52 of the y-oriented straps 40y visible. Portions of two illustrative grid engagement bars 102 are shown in phantom (that is, transparent so that the underlying straps 40y are visible). The grid engagement bars 102 are oriented along the x-direction in order to engage the solid sides 52 of the y-oriented straps 40y. See also FIG. 2, where one such grid engagement bar 102 is shown. In general, the grid engagement bars 102 on a given side of the fixture 90 are oriented transverse to the straps 40 whose solid sides 52 are exposed on that side of the fixture, and the grid engagement bars 102 engage the solid sides 52 of those straps. Each grid engagement bar 102 has a width equal to or less than one cell of the spacer grid 31. This is so that the grid engagement bar 102 fits between the two neighboring (and parallel) straps 40 whose slotted sides 54 are exposed.

Note that the straps whose solid sides are exposed on a given side of the fixture can be "backed out" of the interlocking arrangement from that side—this is prevented by the installed grid engagement bars 102. On the other hand, the straps whose slotted sides are exposed on a given side of the fixture cannot be "backed out" of the interlocking arrangement from that side, because the solid sides of the transverse straps prevent this. Thus, it is recognized herein that it is sufficient on a given side of the fixture to lock only the straps whose solid sides are exposed, and to do the same on the opposite side of the fixture, in order to completely lock the assembled spacer grid.

Figure 8:
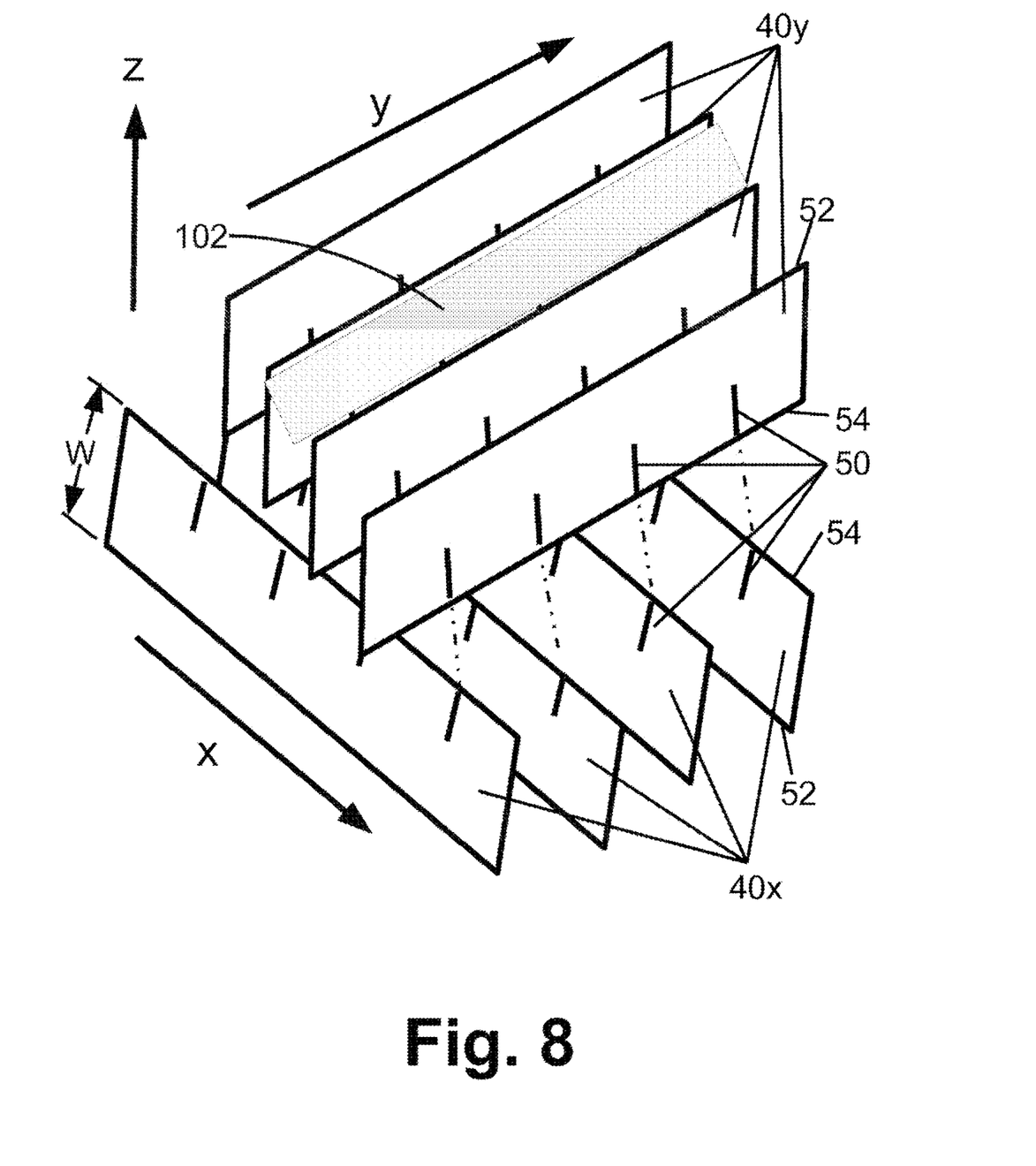
FIGS. 8 and 9 correspond to FIGS. 2 and 7, respectively, but show a variant embodiment in which the grid engagement bars of the fixture engage the slotted sides of the straps.
Figure 9:
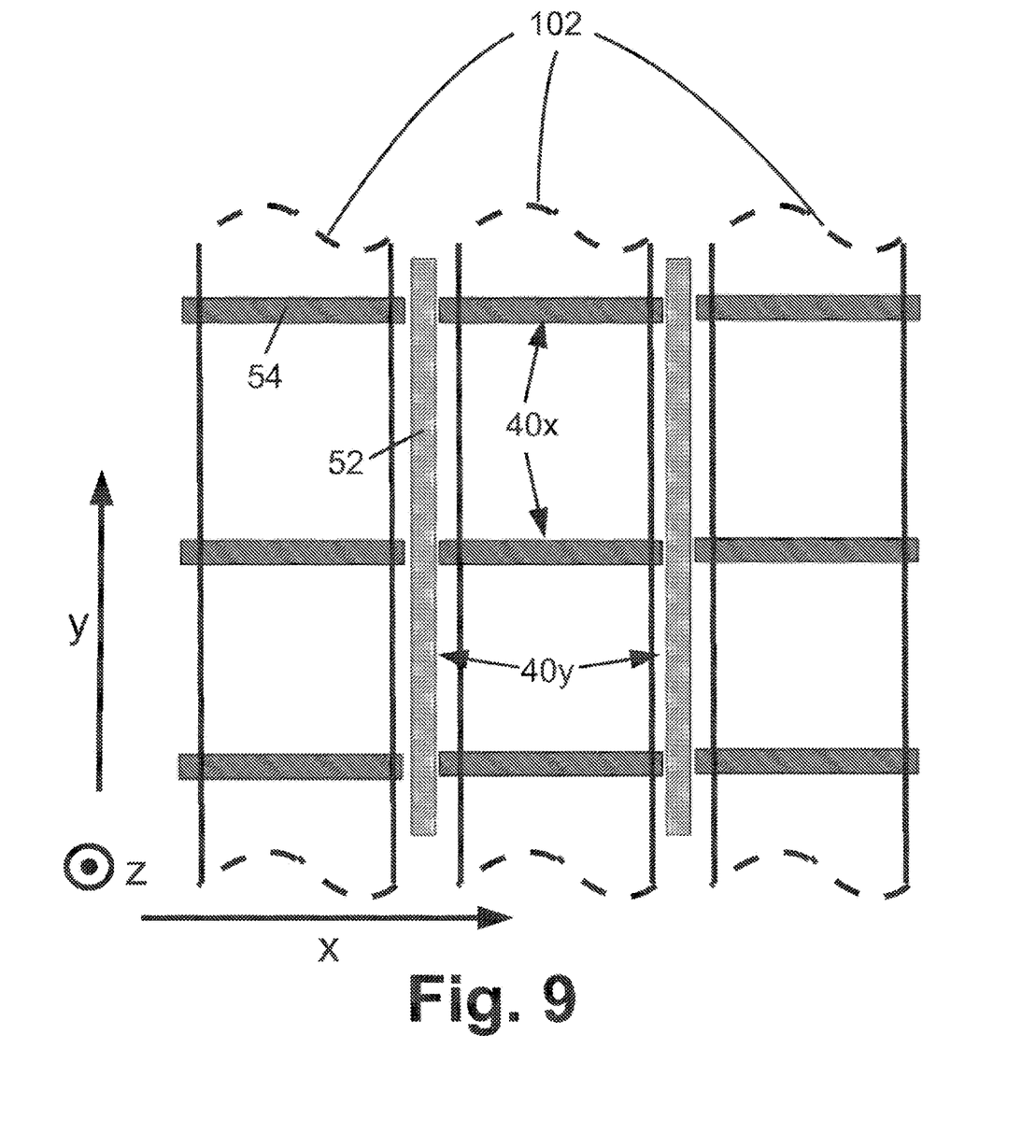

With reference to FIGS. 8 and 9, the grid engagement bars 102 can alternatively engage the slotted sides 54. Illustrative FIGS. 8 and 9 correspond to FIGS. 2 and 7, but for this alternative embodiment. As best seen in FIG. 9, where portions of three illustrative grid engagement bars 102 are shown in phantom, the grid engagement bars 102 are oriented along the y-direction in order to engage the slotted sides 54 of the y-oriented straps. More generally, in this embodiment the grid engagement bars 102 on a given side of the fixture 90 are oriented transverse to the straps 40 whose slotted sides 54 are exposed on that side of the fixture, and the grid engagement bars 102 engage the slotted sides 54 of those straps. Each grid engagement bar 102 again has a width equal to or less than one cell of the spacer grid 31, so that the grid engagement bar 102 fits between the two neighboring (and parallel) straps 40 whose slotted sides 54 are exposed. In this embodiment the straps whose solid sides 52 are exposed are not retained by the grid engagement bar 102, e.g. in the illustrative example of FIGS. 8 and 9 the straps 40y oriented along the y-direction are not retained by the grid engagement bar 102. Since these straps 40y are also not "pinned" by the transverse straps (since the transverse straps 40x are "underneath" the overlying straps 40y in this embodiment), the straps 40y can back out—however, typically frictional forces between the overlying straps 40y and the surfaces of the slots of the underlying transverse straps 40x that are retained by the grid engagement bars 102 is sufficient to prevent this. An advantage of the embodiment of FIGS. 8 and 9 is that the exposed slotted sides 54 which are retained by the grid engagement bars 102 are typically more flexible than the solid sides 52, so that the embodiment of FIGS. 8 and 9 can yield more precise alignment for the welded spacer grid 31.

The mounting of the spacer grid in the disclosed spacer grid welding fixture is as follows. The frame 100 is placed on a suitable flat support surface, e.g. an assembly jig surface 110. The grid is placed into the frame 100. This frame is typically square since the spacer grid is typically square; however, a rectangular but non-square spacer grid and conformal rectangular frame is also contemplated. After grid placement into the frame 100, one set of straps has its solid sides 52 exposed, and the other set of straps has its slotted sides 54 exposed. The grid engagement bars 102 are placed on the exposed side of the fixture (that is, the side opposite the support surface 110) so as to engage the exposed solid sides 52 of the set of straps that have their solid sides exposed (for the embodiment of FIGS. 2 and 7); or, alternatively, the grid engagement bars 102 are placed on the exposed side of the fixture so as to engage the exposed slotted sides 54 of the set of straps that have their slotted sides exposed (for the embodiment of FIGS. 8 and 9). The ends of the grid engagement bars 102 nest into the receiving slots 108 of the frame 100. After all the grid engagement bars 102 for that side of the fixture are installed, the retaining bars 104 are installed and secured, for example using bolts or other fasteners. Then, the frame 100 is lifted off the assembly jig surface 110, flipped over, and replaced on the assembly jig surface 110 so that the opposite side of the fixture is exposed. The process is then repeated, with grid engagement bars 102 placed so as to engage the exposed solid sides 52 of the set of straps that now (after flipping the fixture over) have their solid sides exposed (for the embodiment of FIGS. 2 and 7); or, alternatively, the grid engagement bars 102 are placed so as to engage the exposed slotted sides 54 of the set of straps that now have their slotted sides exposed (for the embodiment of FIGS. 8 and 9). The ends of the grid engagement bars again nest into receiving slots 108 of the frame 100, and after all the grid engagement bars 102 for the second side of the fixture are installed the retaining bars 104 are installed and secured. At this point the fixture can be removed from the assembly jig surface 110 entirely, and the engagement bars 102 on the opposite sides of the fixture retain all straps in the interlocking spacer grid. The welding is then performed. After welding, the retaining bars 104 and grid engagement bars 102 are removed from both sides of the fixture, and the welded spacer grid 31 is removed from the frame 100.

FIG. 1 diagrammatically shows the complete process, starting on the right-hand side lower portion showing the constituent straps 40, 42, which are then assembled in their interlocked arrangement using the spacer grid welding fixture 90 as just described and as diagrammatically indicated in FIG. 1 right-hand side middle portion. After welding is complete, the retaining bars 104 and grid engagement bars 102 are removed and the welded spacer grid 31 is extracted as shown in FIG. 1 right-hand side upper portion. Finally, the welded spacer grids are used as the end grids 30 and mid-grids 32 in assembling the fuel assembly, and the final assembled fuel assembly 20 is shown in FIG. 1 left-hand side.

Numerous variants are contemplated. For example, the retaining bars 104 can be replaced by other mechanisms for retaining the ends of the engagement bars in the frame, such as individual fasteners engaging the ends of the engagement bars. The frame 100 illustrated in FIGS. 5 and 6 is an assembly of side plates secured together by fasteners; alternatively, the frame can be a single forged element or may be otherwise constructed. The engagement bars may include grooves.

The disclosed spacer grid welding fixtures have numerous advantages. The bars 102 and frame 100 are the precision elements of the frame, and these can be manufactured by a high-precision machining process such as electrical discharge machining (EDM). Installation of each grid engagement bar 102 over a single row entails precision alignment in only one dimension, and is easier to control than inserting the entire grid into a fixture plate which requires precision alignment in two dimensions. Strap misalignment is easier to detect. After welding, the grid engagement bars 102 experience forces in only one dimension, and can be removed with much less force than that required to remove a two-dimensional fixture plate.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method comprising:
   (i) disposing an assembled spacer grid comprising a first set of parallel straps and a second set of parallel straps oriented orthogonally to the first set of parallel straps and interlocked with the first set of parallel strips by slots cut into the straps in a frame of a spacer grid welding fixture; and
   (ii) after performing operation (i), disposing grid engagement bars onto the assembled spacer grid with grooves of the grid engagement bars engaging straps of the assembled spacer grid that are oriented orthogonally to the grid engagement bar and with ends of the grid engagement bars nesting into slots in the frame of the spacer grid welding fixture.

2. The method of claim 1 wherein the operation (ii) comprises:
   (iia) disposing a first set of mutually parallel grid engagement bars onto a first side of the assembled spacer grid; and
   (iib) disposing a second set of mutually parallel grid engagement bars onto a second side of the assembled spacer grid opposite the first side of the assembled spacer grid with the second set of mutually parallel grid engagement bars being disposed orthogonally to the first set of mutually parallel grid engagement bars.

3. The method of claim 1 further comprising:
   after performing operation (ii), securing retaining bars onto the frame to lock the ends of the grid engagement bars into the slots in the frame of the spacer grid welding fixture.

4. The method of claim 1 further comprising:
   after performing operation (ii), securing the ends of the grid engagement bars into the slots in the frame of the spacer grid welding fixture.

5. The method of claim 4 further comprising:
   after securing the ends of the grid engagement bars into the slots in the frame of the spacer grid welding fixture, welding junctions between straps of the assembled spacer grid.

6. The method of claim 5 wherein the welding further comprises:
   welding guide tubes to the assembled spacer grid to form a structural skeleton for a fuel assembly.

7. The method of claim 6 further comprising:
   loading fuel rods comprising fissile $^{235}$U into the structural skeleton to generate a nuclear reactor fuel assembly.

* * * * *